Patented Apr. 21, 1931

1,802,292

UNITED STATES PATENT OFFICE

MANUEL GOMES VEIGA, OF BUENOS AIRES, ARGENTINA

INDUSTRIAL PRODUCT BASED UPON PARAGUAYAN TEA

No Drawing.   Application filed August 29, 1928.   Serial No. 302,883.

The present invention relates to a new industrial product which consists in a tea based upon "mate" or Paraguayan tea (Ilex paraguariensis), obtained by means of a special treatment which increases its infusion properties without changing the natural colour of the leaves nor its characteristic and agreeable flavour, conserving also the other essences which make it a delicious beverage.

For the preparation of this new product completely pure "mate" leaves only are used, these being analyzed by the competent authorities before their importation into the consuming markets is allowed, and only the leaves and non-ligneous stems are used, the ligneous ones which do not contain these characteristics, are eliminated by a mechanical process.

Having effected the elimination just mentioned, the herbage is submitted to a rapid fermentation process, provoked by a gentle and persistent aspersion with water which, acting chemically upon the herbage, produces a real hydration. Said hydration constitutes the first phase or the forerunner of a chemical hydrolysis which comes afterwards and where in reality the above mentioned fermentation takes place. An excess of water must be avoided as this would provoke an excessive fermentation, thereby developing countless micro-organisms. After termination of the fermentation, the herbage is put into an oven having a constant temperature (75 centigrades—167° Fahrenheit) during a lapse of time which varies between 5 to 10 minutes. The purpose of this operation is a double one: viz, to eliminate by evaporation the water which may remain from the previous process, a dehydration which under these conditions is advantageously effected, and on the other side to sterilize the product which thus remains free from pathogenic germs.

By means of a system of elevators the treated material is brought to a fan or blower which completes from the hygienic point of view the previous treatment by separating fines, particles of dust, etc.

Carried again by elevators, the product is brought to an hermetically closed receptacle and further fermentation is started, due to the action of vapours of beet-sugar and essence of chicory (Cichorium intybus). The product remains for about 45 minutes under this influence, where the feeble hydration which is produced, brings with it the absorption of the essences of carbonic hydrates, proportioned by those substances, but during this stage of the process an increase of humidity above 20% of the weight of the treated product must be prevented. Finally it is brought, always by means of elevators, to a toasting oven in which the proper grade of torrefaction is reached without which it would lose its natural colour, taste, etc. Another passage through the ventilator puts this product into the best conditions of hygiene and purity of elaboration.

Having now particularly described and specified the nature of my said invention and the manner in which it can be put into practice, what I claim as my exclusive property and invention, is:

1. The process of treating mate, which comprises slowly hydrating the leaves and non-ligneous parts of the plant by sprinkling with water until fermentation takes place, heating the fermented product to evaporate the water and prevent excessive fermentation, fanning the dried product to cleanse the same, starting further fermentation by subjecting the cleansed product to the action of vapors from beet sugar and essence of chicory in a closed chamber to impregnate the product with the vapors and arresting fermentation by toasting the impregnated product in an oven.

2. The process of treating mate, which comprises subjecting the leaves and non-ligneous parts of the plant to a gentle and persistent sprinkling with water to hydrate the material while preventing excessive fermentation, heating the fermented product at a temperature of about 167° F. from five to ten minutes to evaporate the moisture and arrest further fermentation, fanning the heated product to separate fines and dust therefrom, starting further fermentation by subjecting the cleansed product to the action of vapors from beet sugar and the essence of chicory in a closed chamber for about forty-five minutes to impregnate the product, toasting the latter in an oven to arrest fermentation of the impregnated product, and fanning the toasted product.

MANUEL GOMES VEIGA.